United States Patent [19]

Fell et al.

[11] 4,150,773
[45] Apr. 24, 1979

[54] GUIDE ROLLER CONSTRUCTION FOR MAGNETIC TAPE RECORDING/REPRODUCING SYSTEMS, AND ESPECIALLY FOR VIDEO TAPE SYSTEMS

[75] Inventors: Wolfgang Fell, Seeheim; Heinrich Zahn, Rossdorf; Peter Gunschmann, Darmstadt, all of Fed. Rep. of Germany

[73] Assignee: Robert Bosch GmbH, Stuttgart, Fed. Rep. of Germany

[21] Appl. No.: 863,179

[22] Filed: Dec. 22, 1977

[30] Foreign Application Priority Data

Dec. 30, 1976 [DE] Fed. Rep. of Germany ....... 2659558

[51] Int. Cl.² .......................................... B65H 23/04
[52] U.S. Cl. ..................................... 226/196; 29/120; 226/192
[58] Field of Search .............................. 226/190–193, 226/196, 186; 29/120

[56] References Cited

U.S. PATENT DOCUMENTS

| 3,288,338 | 11/1966 | Morrow | 226/193 |
| 3,508,695 | 4/1970 | Werner | 226/196 |
| 3,840,224 | 10/1974 | Zawiski | 29/120 X |

*Primary Examiner*—Richard A. Schacher
*Attorney, Agent, or Firm*—Flynn & Frishauf

[57] ABSTRACT

To decrease forces acting on the edge of magnetic tape, typically wide tape (25.4 mm–1″), and thus prevent damage to the edge, the surface of deflection guide rollers is formed to be resilient and permitting axial deflection, but returning to the nominal radial position when not deflected or deformed by axial forces applied thereto by the magnetic tape. The surface may be formed by bristles extending radially, ring-shaped foam strips, ball bearing-supported rings in which the bearings have slight axial play, or resiliently deflectable sheet metal rings, the axial restoring forces of ball bearing-supported rings being provided by centrifugal forces tending to align the bearing in a plane exactly transversely to the axis of rotation. The forces then acting between the magnetic tape and diametrically projecting guide flanges are reduced since slight axial deflection, in the order of about 0.001 mm, in permitted.

21 Claims, 7 Drawing Figures

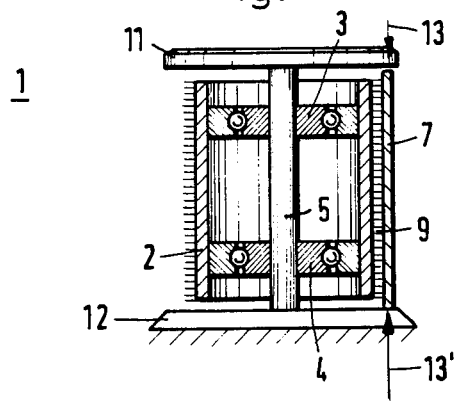
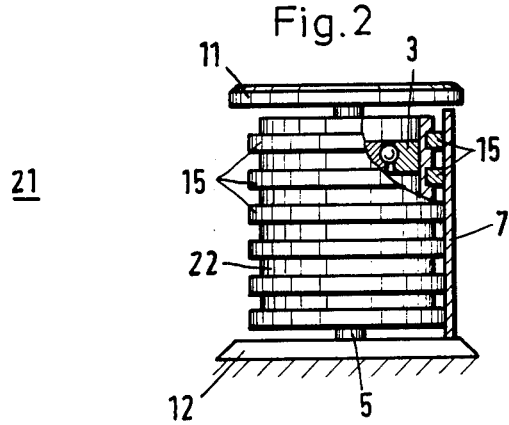
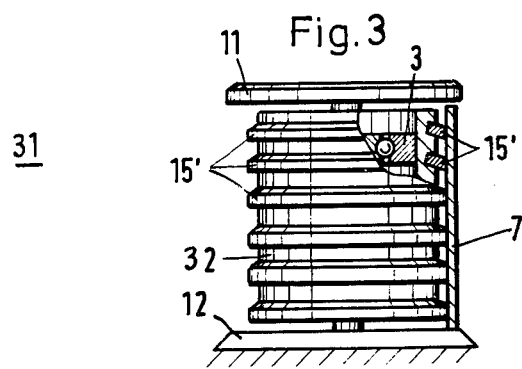

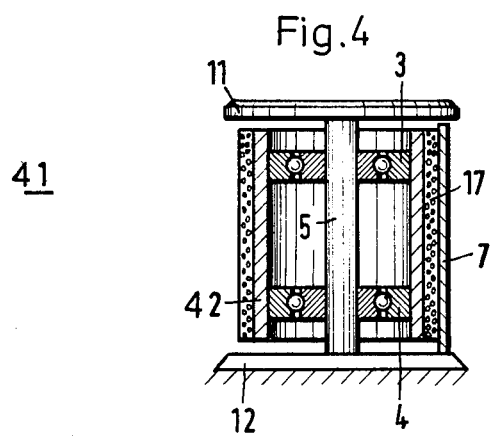
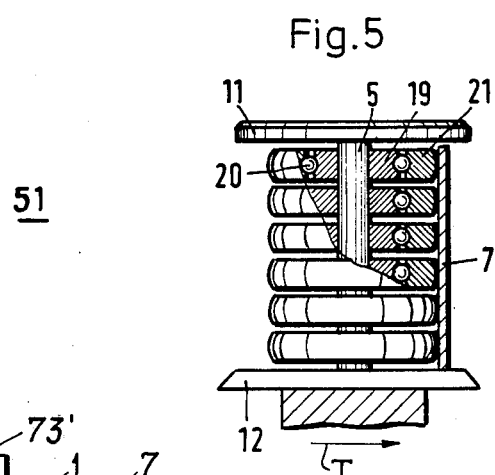
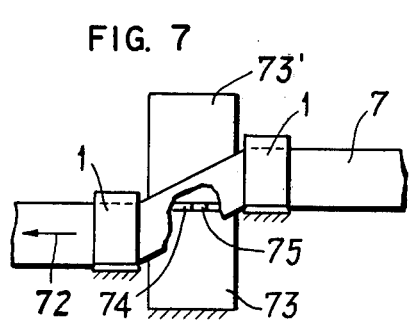
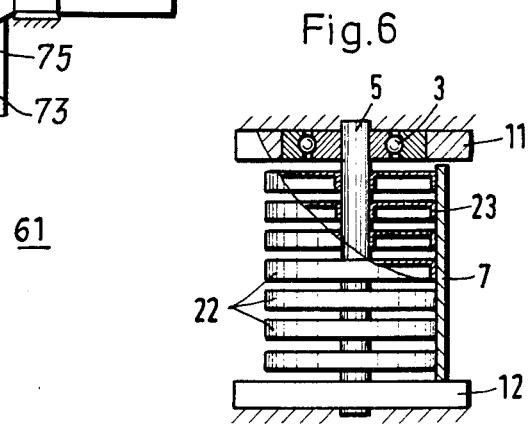

GUIDE ROLLER CONSTRUCTION FOR MAGNETIC TAPE RECORDING/REPRODUCING SYSTEMS, AND ESPECIALLY FOR VIDEO TAPE SYSTEMS

Cross reference to related applications, both assigned to the assignee of the present application: U.S. Ser. No. 856,988, filed Dec. 2, 1977, FELL U.S. Ser. No. 870,876, filed Jan. 20, 1978, FELL et al The present invention relates to the guide roller construction in magnetic tape transport mechanisms of magnetic tape recording/reproducing systems, particularly for video tape recording (VTR).

BACKGROUND AND PRIOR ART

Difficulties are sometimes experienced in the operation of VTR apparatus in that substantial forces arise between the guide flanges of guide rollers about which the tape is being looped and the tape itself. This stresses the edge of the tape and may cause undue wear and tear. Apparatus of the type to which the invention relates is disclosed, for example, in German Disclosure Document DT-OS No. 24 41 663. It has previously been proposed to provide guide flanges which are resiliently positioned. This, however, leads to other difficulties which should be avoided in operation of the apparatus.

THE INVENTION

It is an object to provide a guide roller construction which permits slight axial deviation of the tape with respect to a fixed axial position thereof, and which does not force the tape to slip with respect to the surface portion of the guide roller which is engaged by the tape, which is simple, and efficient in use.

Briefly, the guide surface is so constructed to be resiliently, slighly axially movable to provide for slight axial deflection thereof by axial forces exerted thereon by that portion of the tape which is looped the guide surface. Preferably, the force opposing radial compression of the guide roller should be in the order of at least ten times the force which opposes axial movement of the tape. The permitted axial movement is very small—just enough to prevent substantial engagement forces between the edge of the tape and a guide flange on the roller, the axial movement usually being in the order of 1/1000 mm.

The special construction of the surface of the deflection and guide roller permits lateral deviation of the tape by a very small distance without interfering with frictional engagement of the tape and the surface of the guide roller about which the tape is looped. Thus, the forces acting on the edges of the magnetic tape are decreased, and damage to the edges is reliably avoided even in thin tapes.

Drawings, illustrating examples:

FIG. 1 is a schematic longitudinal sectional view through a guide roller constructed in accordance with the present invention;

FIG. 2 is a side view of a guide roller illustrating another embodiment, with a portion broken away and shown in section;

FIG. 3 is a side view of yet another embodiment, with a portion broken away and shown in section;

FIG. 4 is a longitudinal sectional view of another embodiment;

FIG. 5 is a side view of yet another embodiment, with a portion broken away and shown in section;

FIG. 6 is a side view of still another embodiment, with a portion broken away and shown in section;

and FIG. 7 is a highly schematic illustration of a tape transport system of which the present invention relates.

The guide roller 1 is formed by a cylindrical sleeve 2 which is spaced by ball bearings 3, 4 from a central shaft 5, so that the sleeve 2 is rotatable about shaft 5. Magnetic tape 7 is in engagement with the surface of the guide roller. The surface itself is formed by essentially radially directed short bristles 9 which extend radially from the sleeve 2. The bristles 9 are made of plastic, preferably polyamide, securely adhered to the body 2. The polyamide fibers forming the bristles 9 can be adhered to the cylinder 2, for example, by electrophoresis. Guide flanges 11, 12 are located on the shaft 5 to provide for axial, that is, lateral guidance of the tape 7.

The customary constructions of deflection or guide rollers, in which the surface engaged by the magnetic tape is formed of a stiff or unyielding cylinder, results in substantial guide forces arising between the fixed flanges at the lateral ends of the guide roller and the guide roller surface itself. These forces which can arise at either side of the guide roller are indicated by arrows 13, 13′. The axial guide forces are in the order of the frictional engagement force of the magnetic tape and that portion of the cylindrical surface which is engaged by the tape, that is, about which the tape is looped. The guide forces are substantial, and particularly when using thin tape, can lead to damage of the edges of the tape.

In the construction in accordance with the invention, the tape does not engage the surface of sleeve 2 but, rather, the outer surface of the radially projecting bristles 9 which, conjointly, form a cylindrical surface. The bristles 9 have substantial stiffness in radial direction, but can be deflected by much lower forces in axial direction; in other words, they can bend laterally, but are very resistant to compression. When a magnetic tape is drawn over the surface of the guide roller, laterally exerted forces against the magnetic tape by the guide flanges 11, 12 will permit deviation of deflection of the tape 7 in axial direction, without substantial resistance thereagainst by the bristles 9 which can deflect laterally. Thus, the forces acting on the edges of the magnetic tape 7 are substantially reduced. A reduction of from 40 ponds to 20 ponds may occur. The surface formed by the bristles 9 has the characteristic that, when not axially deflected, it will inherently, due to its resilience, assume the normal, undeflected position. Thus, when the respective bristles 9 are no longer engaged by the tape 7, since the tape 7 has left the portion of the surface about which it is looped, so that axial forces by the tape 7 on the bristles will no longer occur, the bristles will align themselves radially due to their characteristics or, rather, due to the characteristics of the material.

Embodiment of FIG. 2: The deflection roller 21 has a cylindrical sleeve 22 to which a plurality of rings 15 of foam rubber or foam plastic are secured, for example by adhesion. Tape 7 contacts the outer cylindrical surface of the spaced rings 15. To reduce the resilient resetting force in axial direction, the rings preferably have a greater radial projection than their axial thickness. The axial deflection of the rings in the region engaged by the tape 7 may be in the order of 1/1000 mm. In that region of the rings which is not touched by the tape, the inherent resiliency of the material will cause the rings to extend radially in a plane transverse to the axis 5.

Embodiment of FIG. 3: In some installations, it is desirable that the deflection or guide roller has only one guide flange which is arranged for engagement by the tape 7. Roller 31 has rings 15', made of foam rubber and similar to rings 15 (FIG. 2), but so constructed that they can deflect axially in only one direction, in the embodiment shown in downward direction. The sleeve 32 has the rings 15' attached thereto in such a manner that they will point downwardly to direct the tape 7 towards the lower guide flange 12. The respective rings 15' have approximately the form of a portion of a cone surface, the outer circumference thereof, however, being cylindrical as seen in FIG. 3.

FIG. 4: The roller 41 has a sleeve 42 which is entirely covered with a sleeve 17 of foam rubber, foam plastic, or similar foam material. The tape 7 covers the outer surface of the foam sleeve 17 at the looping angle of the design of the equipment. The outer surface of the cylinder 17 can be shifted with respect to the inner surface thereof, secured to the sleeve 42 by relatively small axial forces. This arrangement also substantially decreases the lateral or edge forces acting on the tape 7. Experiments have shown that with a looping angle of about 90°, an axial deflection distance of 1 μm is sufficient in order to so decrease the guide forces acting on the edge of the magnetic tape 7 that forces of 40 ponds will occur in contrast to forces of about 100 ponds if the surface engaged by the tape is a polished steel cylinder. In the experiment, the sleeve 17 was made of foam rubber.

In the embodiments so far described, the radial reset forces of the circumference were obtained primarily by the inherent material characteristics of the surface, that is, by the inherently resilient characteristics thereof. In some constructions, it is desirable to use stiff, non-resilient surfaces, reset of a deflected surface being obtained by the centrifugal forces arising in operation of the roller.

Embodiment of FIG. 5: The roller construction 51 has the inner races 19 of a plurality of coaxially, spaced, radial ball bearings 20 secured thereto. The tape 7 is carried about the outer races 21 of the ball bearings. Preferably, the outer races 21 are slightly spherical, or have rounded outer surfaces. The outer races 21 of the ball bearings 20 can deflect axially by a slight distance due to the usually present play in the bearings themselves. Axial deflection by several micrometers is usually readily possible, so that the magnetic tape can deflect axially without interfering with the frictional engagement between the magnetic tape and the outer races 21, or increasing the friction between the tape and the surface. This construction, also, substantially decreases forces acting between the edges of the tape 7 and the guide flanges 11, 12.

This embodiments also illustrates another feature which is preferably used with the guide roller, and may be applied to the guide roller of any one construction, that is, regardless of the embodiment used. Preferably, the shaft 5 of the guide roller 1, 21, 31 etc. is biassed by a bias force, schematically shown by arrow T, to provide tension on the tape, the tension on the tape being derived, for example, by securing the base of the guide roller on a pivotable lever which forms part of a tape tension control system.

In the embodiment of FIG. 5, reset of the ball bearings 20 to radial alignment in a plane transverse to the axis of shaft 5 is obtained by centrifugal force. If, for example, the tape 7 deflects the ball bearings 20 so that they tip slightly downwardly to the right (with reference of FIG. 5), then the diametrically opposite portion of the ball bearings will tip slightly upwardly. If the looping angle of the tape is such that the tape engages a portion of the upwardly directed ball bearing, then the ball bearing, itself, will tend to return the magnetic tape to exactly centered position between the flanges 11, 12.

The outer circumference of the outer races 21 of the ball bearings can be formed in various shapes, in a preferred form somewhat spherical or, in any event, slightly rounded. If the surfaces themselves are standard ball bearings, then suitable caps or surface rings can be placed thereon which have the desired outer surface to be engaged by the tape itself. The outer surface is stiff and not resiliently deformable. Under centrifugal force, however, the same effect is obtained as that of the resiliently deformable surfaces of FIGS. 1–4.

FIG. 6: A saving in cost of ball bearings can be obtained if, instead of using stacked ball bearings as in FIG. 5, a plurality of thin sheet metal elements are used. The guide roller 61 has stacked disks 21 which have an outer bent-over flange having an end surface 23 which extends essentially parallel to the axis of shaft 5. This bent-over flange, preferably, is slightly spherically shaped (not visible in FIG. 6) to have a shape similar to the outer shape of the races 21 of FIG. 5. The edges of the bend of the flange and the lower free edge should be rounded. Frictional engagement and frictional forces between the magnetic tape 7 and the bent-over flanges 23 of the disks 22 provide for elastic deformation of the disks 22 so that, essentially, the same effect is obtained as that explained in connection with the ball bearings of the roller 51 of FIG. 5. Deflection of the disk 22, downwardly, at one radial portion will, due to material stiffness, cause a corresponding deflection in the other direction at the diametrically opposed side of the disk.

The guide roller is particularly applicable to video tape recording apparatus in which tape of substantial width, for example 1 inch (nominal), or wider, is to be guided; it is applicable to any type of equipment in which forces applied to the lateral edges of the tape should be held to a minimum.

FIG. 7 shows the system in which the present invention is applicable. The tape 7 is guided in the direction of the arrow 72 over two rollers 1—and which may be any one of the rollers explained above, for example 21, 31 . . . 61—the rollers 1 being so arranged that the tape is guided in a spiral path over a cylinder formed of two cylinder halves 73', 73", separated by a narrow gap 74. The space provided by the narrow gap 74 permits positioning a recording head carrier 75 therein, rotating on a shaft (not shown) coaxially with the cylinder halves 73', 73". The recording head carrier 75 carries two video recording/reproducing transducer heads, relatively offset from each other by 180°, and used to scan the magnetic tape 7. The tape 7, by being guided in the spiral path, thus is scanned in inclined, slanting lines, extending at an inclination with respect to the direction of movement of the tape, as represented by the arrow 72.

Various changes and modifications may be made within the scope of the inventive concept.

We claim:
1. In a magnetic tape recording/reproducing system, a guide and deflection roller (1, 21, 31, 41, 51, 61) having a central axis (5), a cylindrical engagement surface rotatable about said axis and adapted to have a portion of its surface contacted by the tape

(7), and at least one end flange (11, 12) projecting radially from the engagement surface to provide for axial guidance of the tape upon engagement of the edges of the tape with a respective flange, wherein, in accordance with the invention, the guide surface is resiliently slightly axially movable to provide for slight axial deflection thereof by axial forces acting thereon by the portion of the tape looped over the guide surface, the force opposing radial compression of the surface by the tape being at least ten times the force opposing axial movement exerted by the portion of the tape looped about the circumference of the guide surface of the roller, the guide surface having the characteristic of inherent radial alignment, and providing a restoring force which tends to restore that portion of the guide surface not contacted by the tape to undeflected position.

2. Guide roller according to claim 1, wherein (FIG. 1) said guide surface is formed by radially projecting short bristles (9).

3. Guide roller according to claim 2, wherein said roller comprises a cylindrical sleeve (2) and bristles (9) of plastic material secured to the sleeve, and projecting radially therefrom.

4. Guide roller according to claim 3, wherein said bristles comprise polyamide.

5. Guide roller according to claim 3, wherein the outer surface of the sleeve (2) is adhesive, and the bristles (9) are secured to the surface of the sleeve (2) by electrophoresis.

6. Guide roller according to claim 1, wherein (FIG. 2) the guide roller (21) comprises a sleeve (22) and rings (15) made of elastically deformable material secured to said sleeve.

7. Guide roller according to claim 6, wherein said elastically deformable rings comprise at least one of: foam rubber; foam plastic.

8. Guide roller according to claim 6, wherein said rings have a projecting distance from said sleeve (22) which is larger than the axial thickness of the rings (15).

9. Guide roller according to claim 6, wherein (FIG. 3) one of the flanges (12) is fixed, and the rings (15') are inclined in the direction towards the fixed flange (12).

10. Guide roller according to claim 1, wherein (FIG. 4) the guide roller (41) comprises a sleeve (2) rotatably mounted with respect to said axis (5);

and an essentially cylindrical cover (17) covering said sleeve, said cylindrical cover comprising a material which is elastically deformable in axial direction but resistant to radial compression.

11. Guide roller according to claim 10, wherein said deformable cover (17) comprises at least one of: foam rubber; foam plastic.

12. Guide roller according to claim 1, wherein (FIG. 5) the guide roller (51) comprises a plurality of stacked, spaced coaxial ball bearings (20).

13. Guide roller according to claim 12, wherein the outer surface of the outer races (21) of the ball bearings are rounded.

14. Guide roller according to claim 13, wherein the outer surfaces of the outer races (21) of the ball bearings are essentially spherical, and the center of the radius of the sphere is approximately in the center of the ball bearing.

15. Guide roller according to claim 1, wherein (FIG. 6) the guide roller (61) comprises a plurality of stacked, essentially thin elastic disks (22) located on the axis (5), the disks having outer circumferences (23) which are rounded.

16. Guide roller according to claim 15, wherein the disks are formed with axially extending flanges (23) forming the outer circumference thereof, said flanges having at least approximately spherical shape, the center of the radius of the spheres being at least approximately centrally of the flanges and on the axis (5) of the guide roller.

17. Guide roller according to claim 1, wherein the guide roller is biassed by a bias force (T), said bias force being applied to the tape to provide controlled bias tape tension to the tape looped, at least in part, about the guide roller.

18. Guide roller according to claim 1, wherein (FIGS. 1, 2, 3, 4) the guide surface of the guide roller has inherent resilient characteristics due to the material of the surface to provide for undeflected radial realignment of the portion of the guide surface free from engagement with the tape.

19. Guide roller according to claim 1, wherein (FIGS. 5, 6) the guide surface of the guide roller is rotatably mounted to rotate about said axis and subject to axial tilting deflection where engaged by the tape, the portion of the guide surface free from tape tilting in opposite direction with respect to the axis of rotation of the guide surface, the oppositely tilted surface providing for a restoring force to the tape for central guidance of the tape (7) upon engagement of the oppositely tilted surface portion with the tape during continued rotation of the guide surface.

20. Guide roller according to claim 1, in combination with a cylindrical video recording/reproducing head, wherein two guide rollers are provided, one each being located in advance and behind the recording cylinder, said guide rollers guiding the tape about the recording cylinder in a spiral path.

21. Guide roller according to claim 1, wherein the axial deflection by the guide surface under the influence of axial forces applied thereto by the tape is in the order of about 1/1000 mm.

* * * * *